United States Patent
Sasame et al.

(10) Patent No.: US 8,568,811 B2
(45) Date of Patent: Oct. 29, 2013

(54) METHOD OF MANUFACTURING TEA DRINK

(75) Inventors: Masami Sasame, Makinohara (JP);
Kenji Shimaoka, Makinohara (JP);
Yoko Haraguchi, Makinohara (JP);
Izumi Kobayashi, Tokyo (JP);
Kazuyoshi Nishimura, Oura-gun (JP);
Hideo Nomura, Oura-gun (JP);
Ken-ichi Abe, Oura-gun (JP); Tetsuya Onuki, Oura-gun (JP)

(73) Assignee: Ito En, Ltd., Tokyo (JP)

( * ) Notice: Subject to any disclaimer, the term of this patent is extended or adjusted under 35 U.S.C. 154(b) by 43 days.

(21) Appl. No.: 12/382,994

(22) Filed: Mar. 27, 2009

(65) Prior Publication Data

US 2009/0191319 A1 Jul. 30, 2009

Related U.S. Application Data

(63) Continuation of application No. PCT/JP2006/325455, filed on Dec. 14, 2006.

(51) Int. Cl.
*A23F 3/16* (2006.01)

(52) U.S. Cl.
USPC ........... 426/435; 426/425; 426/433; 426/590; 426/597; 426/330; 426/330.3; 426/404; 426/521

(58) Field of Classification Search
USPC ......... 426/590, 597, 435, 425, 432, 433, 330, 426/330.3, 404, 521
See application file for complete search history.

(56) References Cited

U.S. PATENT DOCUMENTS 5,922,380 A * 7/1999 Takihara et al. ............. 426/271

FOREIGN PATENT DOCUMENTS

| JP | 57-16649 | | 1/1982 |
|---|---|---|---|
| JP | 61124361 A | * | 6/1986 |
| JP | 61-234738 | | 10/1986 |
| JP | 1-240145 | | 9/1989 |
| JP | 1-252274 | | 10/1989 |
| JP | 4-271751 | | 9/1992 |
| JP | 4-281773 | | 10/1992 |
| JP | 7-222553 | | 8/1995 |
| JP | 2002-211676 | | 7/2002 |
| JP | 2003-284494 | | 10/2003 |
| JP | 2007-6812 | | 1/2007 |

OTHER PUBLICATIONS

JP 2003-284494A, Inoue et al., Machine Translation, Oct. 7, 2003.*
JP 7-222553, Yutaka et al., Machine Translation, Aug. 22, 1995.*
JP 61124361A, Aoyama, Abstract translation, English, Jun. 1986.*
Communication (Supplementary Search Report) in EP Appln No. 06835062.8 dated Sep. 9, 2010.
Database WPI Week 200309 Thomson Scientific, London, GB; AN 2003-096333 XP002598490 & JP 2002 211676 (Coca-Cola Asia Pacific KK), Jul. 31, 2002 *Abstract*.

* cited by examiner

*Primary Examiner* — Lien T. Tran
*Assistant Examiner* — Hong T Yoo
(74) *Attorney, Agent, or Firm* — Foley & Lardner LLP

(57) ABSTRACT

This invention is related to a method of manufacturing a tea drink, which comprises the steps of subjecting tea leaves to extraction to obtain an tea extract and adjusting the pH of the tea extract to the range of 5.0-6.0, mixing nitrogen into the tea extract while applying a negative pressure of 0.01 MPa or more, stabilizing the tea extract in succession to the step of applying a negative pressure by maintaining the tea extract under a pressure of not higher than atmospheric pressure for a period of 30 seconds to 20 minutes, and adjusting the pH of the tea extract to the range of 5.5-6.5 during or subsequent to the step of stabilizing the tea extract.

7 Claims, No Drawings

METHOD OF MANUFACTURING TEA DRINK

CROSS REFERENCE TO RELATED APPLICATIONS

This is a Continuation Application of PCT Application No. PCT/JP2006/325455, filed Dec. 14, 2006, which was published under PCT Article 21(2) in Japanese.

BACKGROUND OF THE INVENTION

1. Field of the Invention

This invention relates to a method of manufacturing a tea drink and, in particular, to a method of manufacturing a tea drink having excellent aroma.

2. Description of the Related Art

Suppression of the deterioration of tea extract due to the oxidization is one of the important problems in the manufacturing process of a tea drink. In view of this problem, there have been proposed various methods for shutting off oxygen from the tea extract. For example, there has been proposed a method to perform the extraction of tea with deaerated water. However, this method is accompanied with a problem that it is unable to have the stable effects, since oxygen may be enabled to redissolve in the tea extract in the processes after the step of extraction. Additionally, there is also a problem that when oxygen is forcedly deaerated from the tea extract, the jumping effects of tea leaves will be lost.

In Japanese Patent No. 3452805, there is described another method, wherein the deaeration is performed with gaseous carbon dioxide. However, this method is accompanied with a problem that, since gaseous carbon dioxide is high in dissolubility to an aqueous solution, it is difficult to completely eliminate gaseous carbon dioxide from the tea extract. If the deaeration of gaseous carbon dioxide is insufficient, the sourness of gaseous carbon dioxide may be permitted to remain in the tea extract, thereby badly affecting the flavor of tea extract. Furthermore, this method is also accompanied with a problem that aroma is permitted to disperse from the tea extract during deaeration of the gaseous carbon dioxide, thereby weakening the inherent aroma of the tea drink.

In JP-A 2002-211676 (KOKAI), there is described a method of manufacturing drinks under a nitrogen atmosphere. However, since this method is directed to prevent oxygen from being dissolved in the tea extract, it is impossible in this method to lower the concentration of the oxygen that has been originally dissolved in the tea extract. In Japanese Patent No. 3083798 which is directed to the manufacture of dairy drinks, there is described a method of decreasing the generation of dimethyl disulfide to be created in the heating of dairy drinks, this method being featured in that the oxygen dissolved in the drinks is substituted by an inert gas such as nitrogen, thereby reducing the concentration of the dissolved oxygen to not more than 5 ppm. However, since a tea drink is very susceptible to changes in color tone and in aroma, this method of suppressing the oxidative deterioration by simply mixing nitrogen into the drinks is hardly applicable to the manufacture of a tea drink having satisfactory features.

BRIEF SUMMARY OF THE INVENTION

An object of the present invention is to provide a method of manufacturing a tea drink, which makes it possible to suppress the loss of aroma that may be caused by the oxidative degradation of tea drink and to provide a tea drink which is stable in quality and excellent in aroma.

Namely, according to the present invention, there are provided:

1. A method of manufacturing a tea drink, which comprises the steps of:
   subjecting tea leaves to extraction to obtain an tea extract and adjusting the pH of the tea extract to the range of 5.0-6.0;
   mixing nitrogen into the tea extract while applying a negative pressure of 0.01 MPa or more;
   stabilizing the tea extract in succession to the step of applying a negative pressure by maintaining the tea extract under a pressure of not higher than atmospheric pressure for a period of 30 seconds to 20 minutes; and
   adjusting the pH of the tea extract to the range of 5.5-6.5 during or subsequent to the step of stabilizing the tea extract;
2. The method of manufacturing a tea drink according to above 1, wherein the tea extract adjusted in pH after the stabilizing step has a concentration of dissolved oxygen which is not higher than 1 ppm;
3. The method of manufacturing a tea drink according to above 1 or 2, wherein the step of stabilizing the tea extract is performed under atmospheric pressure;
4. The method of manufacturing a tea drink according to any one of above 1 to 3, which further comprises a step of sterilizing the tea drink and a step of packaging the tea drink in a sealed container.
5. The method of manufacturing a tea drink according to above 4, wherein the step of packaging the tea drink in a sealed container is performed under sterilized conditions;
6. The method of manufacturing a tea drink according to any one of above 1 to 5, wherein the sealed container is a high barrier PET bottle.

DETAILED DESCRIPTION OF THE INVENTION

According to the present invention, there is provided a method of manufacturing a tea drink, which comprises the steps of: subjecting tea leaves to extraction to obtain an tea extract; adjusting the pH of the tea extract to the range of 5.0-6.0; mixing nitrogen into the tea extract while applying a negative pressure of 0.01 MPa or more; stabilizing the tea extract in succession to the step of applying a negative pressure by maintaining the tea extract under a pressure of not higher than atmospheric pressure for a period of 30 seconds to 20 minutes; and adjusting the pH of the tea extract to the range of 5.5-6.5 during or subsequent to said step of stabilizing the tea extract. In this case, the tea extract that has been adjusted in pH after the aforementioned stabilizing step should preferably be such that the concentration of dissolved oxygen is not higher than 1 ppm. Further, the step of stabilizing the tea extract is performed under atmospheric pressure.

This method may further comprise a step of sterilizing the tea drink and a step of packaging the tea drink in a sealed container. Preferably, this packaging step is performed in sterilized conditions. Further, the sealed container is made of high barrier PET.

The present invention is directed to a method of manufacturing a tea drink which is excellent in aroma and in color tone and, more preferably, a method of manufacturing a packaged tea drink. The present inventors have been found that the oxidization of the tea extract is promoted by heating and found out. Hence the present inventors made it possible to provide a tea drink which is excellent in aroma, as a consequence of reducing the concentration of dissolved oxygen in an tea extract prior to the step of sterilization where the tea extract is exposed to heat load most vigorously in the entire manufacturing steps and therefore is most vulnerable to the influence of the dissolved oxygen.

In the present invention, for decreasing the concentration of dissolved oxygen in a tea extract, a method of mixing nitrogen into a tea extract is employed. However, there is a problem that since the features of green tea drink are easily liable to change, when this method of mixing nitrogen into a tea extract is actually executed, the color tone and aroma of tea drink are caused to deteriorate. It was revealed by the present inventors that this adverse influence on the features of tea drink by the mixing of nitrogen is caused due to the rise of pH of the tea drink, and, based on this finding, the present inventors have succeeded to suppress this adverse influence of nitrogen by controlling the pH of the tea drink.

In the manufacturing method of a tea drink according to the present invention, tea leaves are at first subjected to an extraction process, thereby preparing a tea extract. As for the extraction method for tea leaves, it may be performed according to the conventional method. With respect to the conditions for the extraction such as the extraction temperature and extraction time, it may be optionally selected taking into account the kind of tea leaves, the features of tea drink aimed at, etc. After finishing the extraction of tea leaves, the tea leaves are separated from liquid components and the liquid components are allowed to cool. Then, the liquid components are subjected to filtration to obtain a clear tea extract. This tea extract may be optionally diluted.

Then, the pH of this tea extract thus obtained is adjusted to the range of 5.0-6.0, preferably the range of 5.3-5.8. On the occasion of in a subsequent step of mixing nitrogen into the tea extract, when the pH of this tea extract is higher than 6.0 the browning in color or smelling of deterioration of the tea extract may be caused to generate. On the other hand, when the pH of this tea extract is lower than 5.0, not only so-called sweet potato-like smell but also the cream-down may be caused to generate. When the pH of this tea extract is confined to the range of 5.0-6.0 according to the method of the present invention, it is possible to prevent the deterioration of the aroma and properties of tea drink. When the pH of this tea extract is confined to the aforementioned preferable range of 5.3-5.8, the deterioration of the aroma and properties of tea drink can be further minimized. With respect to the adjustment of pH of the tea extract, it may be performed with suitable additives which are well known in the art. For example, it is possible to use, without limitation, ascorbic acid, sodium bicarbonate, etc.

Then, the tea extract that has been adjusted in pH is mixed with nitrogen. The mixing of the tea extract with nitrogen can be performed according to any method which is well known in the art. For example, it can be performed by means of gas replacement process. Subsequently, immediately after mixing of the tea extract with nitrogen, a negative pressure of 0.01 MPa or more is applied to the tea extract. Namely, a minus differential pressure of not less than 0.01 MPa is applied to the tea extract. By applying a minus differential pressure of not less than 0.01 MPa to the tea extract, the mixing and dispersion of nitrogen can be promoted, thereby enabling nitrogen to stably disperse in the tea extract and hence making it possible to effectively reduce the concentration of oxygen in the tea extract. With respect to the magnitude of the negative pressure to be applied, there is not any particular limitation as long as it is possible to realize a minus differential pressure of not less than 0.01 MPa. However, in viewpoint of foaming, the magnitude of the negative pressure to be applied should be confined to 1 MPa at most, more preferably to not higher than 0.5 MPa.

Then, the tea extract is exposed to a pressure of not higher than atmospheric pressure and maintained under this pressure for a time period of 30 seconds to 20 minutes, preferably 30 seconds to 10 minutes, thereby stabilizing it. Maintaining the tea extract under a pressure of not higher than atmospheric pressure, the oxygen as well as nitrogen left remaining in the tea extract can be eliminated from the tea extract, thereby stabilizing the tea extract that has been mixing with the nitrogen. As a result of this process, it is possible to minimize the concentration of dissolved oxygen in the tea drink thus manufactured and also to minimize the generation of non-uniformity of pH of the tea drink.

When the stabilizing period is too long on this occasion, the re-dissolution of oxygen may be caused to generate. Therefore, the stabilizing period should be limited to 20 minutes at most. When the stabilizing period is limited to not longer than 10 minutes, the re-dissolution of oxygen can be more effectively suppressed.

Thereafter, the pH of the tea extract thus stabilized is adjusted again. The pH in this step should preferably be adjusted to the range of 5.5 to 6.5 in viewpoint of suppressing the deterioration of the aroma and color tone of the tea extract. More preferably, the pH should be adjusted to the range of 5.8 to 6.3, thereby making it possible to minimize the deterioration of the aroma and color tone of the tea extract in a subsequent step of sterilization.

The tea extract prepared according to the aforementioned steps generally has the quantity of dissolved oxygen of 1 ppm or less.

The tea extract thus obtained is then subjected to thermal sterilization and packaged in a sealed container, thus providing it as a product of tea drink.

As described above, according the method of the present invention, the concentration of dissolved oxygen in the tea extract can be stably decreased, thereby making it possible to reliably suppress the oxidative deterioration caused by the mixing of nitrogen and the thermal sterilization. As a result, it is possible to stably provide a tea drink which is not only excellent in aroma and color tone but also capable of retaining the inherent flavor of tea.

The tea drink manufactured according to the method of the present invention may be packaged in any kind of sealed containers such as a polyethylene terephthalate resin bottle (PET bottle), a glass bottle, a can, paper pack, etc. It is especially preferable, without limitation, to package the tea extract in a high-barrier PET bottle. Herein, the high-barrier PET bottle means a PET bottle which is made from a multi-layered resin or comprises a material having oxygen absorption capability, thereby making it possible to decrease the permeation of oxygen. This high-barrier PET bottle may be any kinds of PET bottles as long as they are capable of reducing the permeation of oxygen as compared with the ordinary PET bottle.

EXAMPLES

The tea drink was prepared according to the method of the present invention and then subjected to organoleptic test. The preparation methods of a tea drink in each of Examples and Comparative Examples are explained in detail as follows.

Example 1

100 g of green tea leaves was subjected to extraction for four minutes at a temperature of 85° C. and then separated from liquid components and the liquid components are allowed to cool down to 25° C. Then, the liquid components are subjected to filtration to obtain a clear tea extract. Thereafter, to this tea extract was added 3 g of ascorbic acid (BASF Takeda Vitamin Co., Ltd.). Further, the pH of this tea extract was adjusted to 5.7 with sodium bicarbonate to obtain 10 kg of a formulated liquid.

This formulated liquid was then mixed with nitrogen by way of a gas replacement process. Subsequently, a negative pressure of 0.04 MPa was applied to the formulated liquid, after which the formulated liquid was maintained under the atmospheric pressure for 7 minutes to stabilize it and, at the same time, the pH of the formulated liquid was adjusted to 6.2 with ascorbic acid. At this moment, the concentration of the dissolved oxygen in the formulated liquid was 0.2 ppm.

Subsequently, the formulated liquid was subjected to sterilization for 30 seconds at a temperature of 136° C. and then poured into a PET bottle to obtain a bottled green tea drink.

Example 2

100 g of green tea leaves was subjected to extraction for four minutes at a temperature of 85° C. and then separated from liquid components and the liquid components are allowed to cool down to 25° C. Then, the liquid components are subjected to filtration to obtain a clear tea extract. Thereafter, to this tea extract was added 3 g of ascorbic acid (BASF Takeda Vitamin Co., Ltd.). Further, the pH of this tea extract was adjusted to 5.6 with sodium bicarbonate to obtain 10 kg of a formulated liquid.

This formulated liquid was then mixed with nitrogen by way of a gas replacement process. Subsequently, a negative pressure of 0.03 MPa was applied to the formulated liquid, after which the formulated liquid was maintained under the atmospheric pressure for one minute to stabilize it and, at the same time, the pH of the formulated liquid was adjusted to 6.1 with ascorbic acid. At this moment, the concentration of the dissolved oxygen in the formulated liquid was 0.3 ppm.

Subsequently, the formulated liquid was subjected to sterilization for 30 seconds at a temperature of 136° C. and then poured into a PET bottle to obtain a bottled green tea drink.

Example 3

100 g of green tea leaves was subjected to extraction for four minutes at a temperature of 85° C. and then separated from liquid components and the liquid components are allowed to cool down to 25° C. Then, the liquid components are subjected to filtration to obtain a clear tea extract. Thereafter, to this tea extract was added 3 g of ascorbic acid (BASF Takeda Vitamin Co., Ltd.). Further, the pH of this tea extract was adjusted to 5.7 with sodium bicarbonate to obtain 10 kg of a formulated liquid.

This formulated liquid was then mixed with nitrogen by way of a gas replacement process. Subsequently, a negative pressure of 0.04 MPa was applied to the formulated liquid, after which the formulated liquid was maintained under the atmospheric pressure for two minutes to stabilize it and, at the same time, the pH of the formulated liquid was adjusted to 6.2 with ascorbic acid. At this moment, the concentration of the dissolved oxygen in the formulated liquid was 0.3 ppm.

Subsequently, the formulated liquid was subjected to sterilization for 30 seconds at a temperature of 136° C. and then poured into a sterilized PET bottle under aseptic conditions to obtain a bottled green tea drink.

Example 4

A sterilized formulated liquid was obtain at the same processes of Example 1, which was then poured into a high-barrier bottle (Hokkai Can Manufacturing Co., Ltd.) to obtain a bottled green tea drink.

Comparative Example 1

100 g of green tea leaves was subjected to extraction for four minutes at a temperature of 85° C. and then separated from liquid components and the liquid components are allowed to cool down to 25° C. Then, the liquid components are subjected to filtration to obtain a clear tea extract. Thereafter, to this tea extract was added 3 g of ascorbic acid (BASF Takeda Vitamin Co., Ltd.). Further, the pH of this tea extract was adjusted to 6.3 with sodium bicarbonate to obtain 10 kg of a formulated liquid. At this moment, the concentration of the dissolved oxygen in the formulated liquid was 7.2 ppm.

This formulated liquid was then mixed with nitrogen by way of a gas replacement process. Subsequently, a negative pressure of 0.05 MPa was applied to the formulated liquid, after which the formulated liquid was maintained under the atmospheric pressure for three minutes. At this moment, the concentration of the dissolved oxygen in the formulated liquid was 0.3 ppm.

Subsequently, the formulated liquid was subjected to sterilization for 30 seconds at a temperature of 136° C. and then poured into a PET bottle to obtain a bottled green tea drink.

Comparative Example 2

100 g of green tea leaves was subjected to extraction for four minutes at a temperature of 85° C. and then separated from liquid components and the liquid components are allowed to cool down to 25° C. Then, the liquid components are subjected to filtration to obtain a clear tea extract. Thereafter, to this tea extract was added 3 g of ascorbic acid (BASF Takeda Vitamin Co., Ltd.). Further, the pH of this tea extract was adjusted to 4.6 with sodium bicarbonate to obtain 10 kg of a formulated liquid. At this moment, the concentration of the dissolved oxygen in the formulated liquid was 7.5 ppm.

This formulated liquid was then mixed with nitrogen by way of a gas replacement process. Subsequently, a negative pressure of 0.05 MPa was applied to the formulated liquid, after which the formulated liquid was maintained under the atmospheric pressure for three minutes. At this moment, the concentration of the dissolved oxygen in the formulated liq-uid was 0.3 ppm.

Subsequently, the formulated liquid was subjected to sterilization for 30 seconds at a temperature of 136° C. and then poured into a PET bottle to obtain a bottled green tea drink.

Comparative Example 3

100 g of green tea leaves was subjected to extraction for four minutes at a temperature of 85° C. and then separated from liquid components and the liquid components are allowed to cool down to 25° C. Then, the liquid components are subjected to filtration to obtain a clear tea extract. Thereafter, to this tea extract was added 3 g of ascorbic acid (BASF Takeda Vitamin Co., Ltd.). Further, the pH of this tea extract was adjusted to 6.2 with sodium bicarbonate to obtain 10 kg of a formulated liquid. At this moment, the concentration of the dissolved oxygen in the formulated liquid was 7.6 ppm.

Subsequently, the formulated liquid was subjected to sterilization for 30 seconds at a temperature of 136° C. and then poured into a PET bottle to obtain a bottled green tea drink.

Comparative Example 4

100 g of green tea leaves was subjected to extraction for four minutes at a temperature of 85° C. and then separated from liquid components and the liquid components are allowed to cool down to 25° C. Then, the liquid components are subjected to filtration to obtain a clear tea extract. Thereafter, to this tea extract was added 3 g of ascorbic acid (BASF Takeda Vitamin Co., Ltd.). Further, the pH of this tea extract was adjusted to 5.7 with sodium bicarbonate to obtain 10 kg of a formulated liquid. At this moment, the concentration of the dissolved oxygen in the formulated liquid was 7.6 ppm.

This formulated liquid was then mixed with nitrogen by way of a gas replacement process. Subsequently, this formulated liquid was maintained under the atmospheric pressure for four minutes to stabilize it and, at the same time, the pH of this formulated liquid was adjusted to 6.1 with ascorbic acid. At this moment, the concentration of the dissolved oxygen in the formulated liquid was 1.8 ppm.

Subsequently, the formulated liquid was subjected to sterilization for 30 seconds at a temperature of 136° C. and then poured into a PET bottle to obtain a bottled green tea drink.

Comparative Example 5

100 g of green tea leaves was subjected to extraction for four minutes at a temperature of 85° C. and then separated from liquid components and the liquid components are allowed to cool down to 25° C. Then, the liquid components are subjected to filtration to obtain a clear tea extract. Thereafter, to this tea extract was added 3 g of ascorbic acid (BASF Takeda Vitamin Co., Ltd.). Further, the pH of this tea extract was adjusted to 5.7 with sodium bicarbonate to obtain 10 kg of a formulated liquid. At this moment, the concentration of the dissolved oxygen in the formulated liquid was 7.6 ppm.

This formulated liquid was then mixed with nitrogen by way of a gas replacement process. Subsequently, a negative pressure of 0.04 MPa was applied to the formulated liquid, which was then subjected, without maintaining it under atmospheric pressure, to sterilization for 30 seconds at a temperature of 136° C. and then poured into a PET bottle to obtain a bottled green tea drink.

Comparative Example 6

100 g of green tea leaves was subjected to extraction for four minutes at a temperature of 85° C. and then separated from liquid components and the liquid components are allowed to cool down to 25° C. Then, the liquid components are subjected to filtration to obtain a clear tea extract. Thereafter, to this tea extract was added 3 g of ascorbic acid (BASF Takeda Vitamin Co., Ltd.). Further, the pH of this tea extract was adjusted to 5.6 with sodium bicarbonate to obtain 10 kg of a formulated liquid. At this moment, the concentration of the dissolved oxygen in the formulated liquid was 7.8 ppm.

This formulated liquid was then mixed with nitrogen by way of a gas replacement process. Subsequently, a negative pressure of 0.05 MPa was applied to the formulated liquid, after which the formulated liquid was maintained under the atmospheric pressure for 30 minutes to stabilize it and, at the same time, the pH of the formulated liquid was adjusted to 6.2 with ascorbic acid. At this moment, the concentration of the dissolved oxygen in the formulated liquid was 1.7 ppm.

Subsequently, the formulated liquid was subjected to sterilization for 30 seconds at a temperature of 136° C. and then poured into a PET bottle to obtain a bottled green tea drink.

Comparative Example 7

100 g of green tea leaves was subjected to extraction for four minutes at a temperature of 85° C. and then separated from liquid components and the liquid components are allowed to cool down to 25° C. Then, the liquid components are subjected to filtration to obtain a clear tea extract. Thereafter, to this tea extract was added 3 g of ascorbic acid (BASF Takeda Vitamin Co., Ltd.). Further, the pH of this tea extract was adjusted to 5.8 with sodium bicarbonate to obtain 10 kg of a formulated liquid. At this moment, the concentration of the dissolved oxygen in the formulated liquid was 7.6 ppm.

This formulated liquid was then mixed with nitrogen by way of a gas replacement process and then subjected to sterilization for 30 seconds at a temperature of 136° C. and poured into a PET bottle to obtain a bottled green tea drink.

Comparative Example 8

100 g of green tea leaves was subjected to extraction for four minutes at a temperature of 85° C. and then separated from liquid components and the liquid components are allowed to cool down to 25° C. Then, the liquid components are subjected to filtration to obtain a clear tea extract. Thereafter, to this tea extract was added 3 g of ascorbic acid (BASF Takeda Vitamin Co., Ltd.). Further, the pH of this tea extract was adjusted to 6.0 with sodium bicarbonate to obtain 10 kg of a formulated liquid. At this moment, the concentration of the dissolved oxygen in the formulated liquid was 7.4 ppm.

This formulated liquid was then subjected to a deaeration treatment by way of a vacuum deaeration method until the concentration of the dissolved oxygen was decreased to 3.6 ppm. The resultant liquid was then subjected to sterilization for 30 seconds at a temperature of 136° C. and poured into a PET bottle to obtain a bottled green tea drink.

Results

The green tea drinks obtained in Examples and Comparative Examples were subjected to organoleptic test immediately after the manufacture thereof and after the storage in two weeks at 37° C. The evaluation of these tea drinks immediately after the manufacture thereof was defined as being a primary evaluation and the evaluation of these tea drinks after the storage at a temperature of 37° C. for two weeks was defined as being a secondary evaluation, the results of these evaluations being illustrated in Tables 1 and 2. The organoleptic test was performed by five skilled examiners, wherein the criterion of evaluation was as follows: Excellent=4 points; Somewhat good=3 points; Somewhat bad=2 points; and Bad=1 point. With respect to the overall evaluation, an average point of the five skilled examiners was represented by the following symbols: ⊚=3.5 points or more; ○=2.5 points or more; Δ=1.5 to less than 2.5; and X=less than 1.5.

TABLE 1

|  |  | Unit | Example 1 | Example 2 | Example 3 | Example 4 | Comparative Example 1 | Comparative Example 2 |
|---|---|---|---|---|---|---|---|---|
| Formulation | pH | — | 5.7 | 5.6 | 5.7 | 5.7 | 6.3 | 4.6 |
|  | Oxygen content | ppm | 7.4 | 7.5 | 7.6 | 7.4 | 7.2 | 7.5 |
| Mixing of nitrogen |  | MPa | Yes | Yes | Yes | Yes | Yes | Yes |

TABLE 1-continued

|  | Unit | Example 1 | Example 2 | Example 3 | Example 4 | Comparative Example 1 | Comparative Example 2 |
|---|---|---|---|---|---|---|---|
| Negative pressure | Minutes | 0.04 | 0.03 | 0.04 | 0.04 | 0.05 | 0.05 |
| Stabilization time | — | 7 | 1 | 2 | 7 | 3 | 3 |
| After mixing of nitrogen (before sterilization) pH | ppm | 6.2 | 6.1 | 6.2 | 6.2 | 6.8 | 5.3 |
| After mixing of nitrogen (before sterilization) Oxygen content | — | 0.2 | 0.3 | 0.3 | 0.2 | 0.3 | 0.3 |
| Method of filling | — | Semi-aseptic filling | Semi-aseptic filling | Aseptic filling | Semi-aseptic filling | Semi-aseptic filling | Semi-aseptic filling |
| Container | — | PCT | PET | PET | High-barrier PET | PET | PET |
| Primary evaluation Aroma | — | ○ | ○ | ○ | ○ | Δ | X |
| Primary evaluation Taste | — | ○ | ○ | ○ | ○ | Δ | Δ |
| Primary evaluation Color | — | ○ | ○ | ◎ | ○ | X | Δ |
| Secondary evaluation Aroma | — | ○ | ○ | ○ | ◎ | Δ | X |
| Secondary evaluation Taste | — | ○ | ○ | ○ | ○ | Δ | Δ |
| Secondary evaluation Color | — | ◎ | ◎ | ○ | ◎ | X | Δ |
| Overall evaluation | ※ | Excellent in primary and secondary evaluations | Excellent in primary and secondary evaluations | Excellent in primary and secondary evaluations, especially excellent in color | Excellent in primary and secondary evaluations, no deterioration in taste and especially excellent in secondary evaluation | Plain aroma and taste and browning in color | Sweet potato-like smell |

※ ◎: Excellent, ○: Good, Δ: Somewhat bad, X: Failure

TABLE 2

|  | Unit | Comparative Example 3 | Comparative Example 4 | Comparative Example 5 | Comparative Example 6 | Comparative Example 7 | Comparative Example 8 |
|---|---|---|---|---|---|---|---|
| Formulation pH | — | 6.2 | 5.7 | 5.7 | 5.6 | 5.8 | 6.0 |
| Formulation Oxygen content | ppm | 7.6 | 7.6 | 7.6 | 7.8 | 7.6 | 7.4 |
| Mixing of nitrogen | MPa | No | Yes | Yes | Yes | Yes | No |
| Negative pressure | Minutes | No | No | 0.04 | 0.05 | No | — |
| Stabilization time | — | 0 | 4 | 0 | 30 | 0 | 0 |
| After mixing of nitrogen (before sterilization) pH | ppm | — | 6.1 | — | 6.2 | — | 6.3 |
| After mixing of nitrogen (before sterilization) Oxygen content | — | — | 1.8 | — | 1.7 | — | 3.6 |
| Method of filling | — | Semi-aseptic filling | Semi-aseptic filling | Semi-aseptic filling | Semi-aseptic filling | Semi-aseptic filling | Semi-aseptic filling |
| Container | — | PET | PET | PET | PET | PET | PET |
| Primary evaluation Aroma | — | X | Δ | Δ | Δ | Δ | X |
| Primary evaluation Taste | — | Δ | Δ | Δ | Δ | Δ | Δ |
| Primary evaluation Color | — | X | Δ | Δ | Δ | Δ | Δ |
| Secondary evaluation Aroma | — | X | Δ | Δ | Δ | Δ | X |
| Secondary evaluation Taste | — | Δ | Δ | Δ | Δ | Δ | Δ |
| Secondary evaluation Color | — | X | Δ | Δ | Δ | Δ | Δ |
| Overall evaluation | ※ | Weak aroma and browning in color | Somewhat weak aroma and slight browning in color | Somewhat weak aroma and slight browning in color | Somewhat weak aroma and slight browning in color | Somewhat weak aroma and slight browning in color | Flat aroma |

※ ◎: Excellent, ○: Good, Δ: Somewhat bad, X: Failure

In Comparative Example 1, the tea drink had a plain taste and browning of color was recognized. In Comparative Example 2, so-called sweet potato-like smell was generated. In both Comparative Examples 1 and 2, the pH of the tea extract was outside the desirable range as defined by the present invention. It was indicated that the flavor of tea was affected by the incomplete adjustment of the pH.

In Comparative Example 3, the tea drink had a weak aroma, and smelling of deterioration of the taste and browning of color were observed. It was assumed that the phenomenon was occurred due to the fact that the mixing of nitrogen was not performed. In Comparative Example 4, it was indicated that the nitrogen replacement was insufficient because although the mixing of nitrogen was conducted, a step of applying a negative pressure was not performed.

In Comparative Example 5, which was not performed the step of stabilizing, the tea drink had a weak aroma and a tendency to generate browning of color. In Comparative Example 7, which was performed the mixing of nitrogen but not performed a step of applying a negative pressure and a step of stabilizing, the tea drink had a weak aroma and browning of color was occurred.

Whereas, in Example 3 which was performed almost the same conditions as these comparative examples, the tea drink had an excellent aroma and an excellent color, thus indicating the nitrogen replacement was performed effectively due to the step of applying a negative pressure and the step of stabilization.

In Comparative Example 6, the aroma and the color of tea drink was slightly deteriorated. It was thought that the re-dissolution of oxygen was generated because of the prolonged stabilization process.

In Comparative Example 8, although the deaeration treatment was performed, the evaluation of aroma was found very bad, thus indicating that the aroma was caused to vanish by the deaeration treatment.

Whereas, in Examples 1, 2, 3 and 4 which the tea drink was mixed with nitrogen, and the subsequent steps including a step of applying a negative pressure, a step of stabilization and a step of pH adjustment were performed in accordance with the method of the present invention, these examples showed excellent results.

In Example 4, due to the employment of a high-barrier bottle, markedly effect was shown in the secondary evaluation indicating especially excellent results.

According to the present invention, it is possible to suppress the oxidative deterioration during the manufacturing process of tea drink and hence to manufacture a bottled tea drink which is excellent in stability of quality as well as in aroma and color tone.

What is claimed is:

1. A method of manufacturing a tea beverage comprising the steps of:
    subjecting tea leaves to extraction to obtain a tea extract and adjusting the pH of the tea extract to the range of 5.0-6.0;
    mixing nitrogen into the pH-adjusted tea extract to decrease a dissolved oxygen concentration of the tea extract;
    applying a negative pressure of between 0.01 MPa and 1 MPa to the tea extract into which nitrogen is mixed;
    after applying said negative pressure, exposing the tea extract to a pressure of not higher than atmospheric pressure for a period of 30 seconds to 20 minutes to remove oxygen and nitrogen in the tea extract;
    adjusting the pH of the tea extract to the range of 5.5-6.5 during or subsequent to said step of exposing the tea extract to the pressure; and
    producing the tea beverage comprising the tea extract.

2. The method according to claim 1, wherein the tea extract adjusted in pH after said exposing step has a concentration of dissolved oxygen which is not higher than 1 ppm.

3. The method according to claim 1, further comprising:
    a step of sterilizing the tea extract subsequent to said step of adjusting the pH of the tea extract to the range of 5.5-6.5, and
    a step of filling a container with the sterilized tea extract.

4. The method according to claim 3, wherein the step of filling a container with the sterilized tea extract is performed under sterilized conditions.

5. The method according to claim 3, wherein the container is a high barrier PET bottle.

6. The method according to claim 1, wherein the negative pressure in the step of applying a negative pressure is in the range of 0.01 MPa to 0.04 MPa.

7. The method according to claim 1, wherein the negative pressure in the step of applying a negative pressure is in the range of 0.03 MPa to 0.04 MPa.

* * * * *